Patented May 8, 1928.

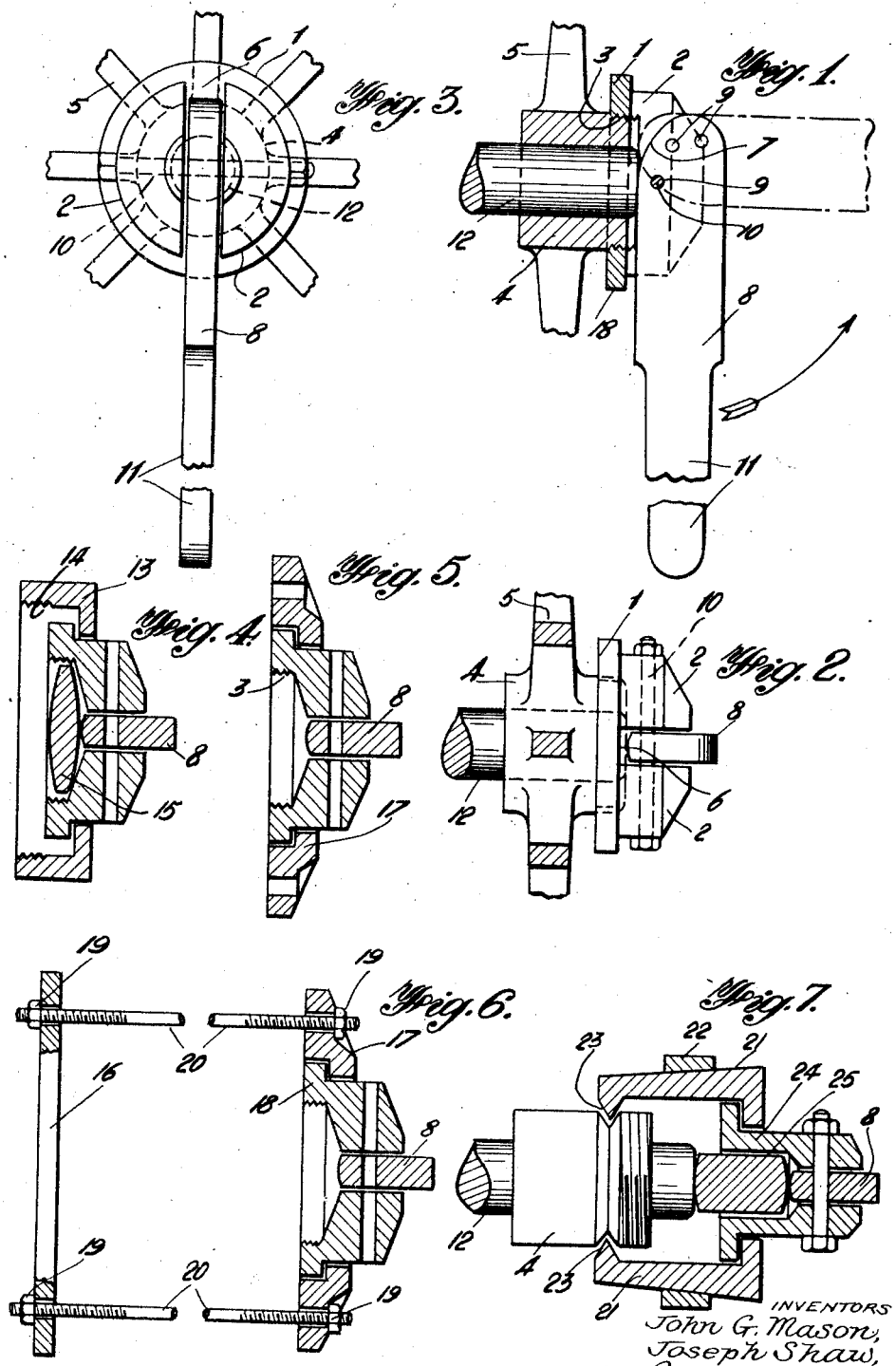

1,668,688

UNITED STATES PATENT OFFICE.

JOHN GEORGE MASON AND JOSEPH SHAW, OF DURHAM, ENGLAND.

DRAWING DEVICE FOR REMOVING WHEELS, PULLEYS, AND OTHER LIKE OBJECTS FROM SHAFTS, AXLES, AND THE LIKE.

Application filed May 26, 1926, Serial No. 111,801, and in Great Britain March 5, 1926.

The invention relates to improvements in and relating to drawing devices for removing wheels, pulleys and other like objects from shafts, axles and the like, and has for its object to provide a simple and efficient form of such device which will obviate appreciably the risk of injury to an operator and to the object operated upon.

According to this invention a drawing device for the above purpose, comprises a member carrying a lever, the said lever being adapted to exert a progressively increasing pressure upon an element, for instance an axle, with which is relatively movably associated another element, for instance a wheel, to which the said member is adapted to be connected.

A simple embodiment of this invention for removing wheels from axles, comprises a collar adapted to be connected to the hub of a wheel, the said collar having extending diametrically across it a cam shaped lever having as an extension a hand lever, the cam shaped lever being pivotally supported by the said collar. If desired the said collar may be provided with one or more further collars adapted to be disposed concentrically about the said collar, said further collar being adapted to be engaged with the hub of a wheel. By this means the device can be adaptable to different diameters of wheels.

When the hub of a pulley wheel or the like is some distance from the end of the shaft from which it is to be removed, the said collar can have attached to it in directions parallel to the axis of the shaft a pair of rods carrying at their outer ends a transverse plate adapted to be engaged with the pulley or its equivalent.

In order that this invention may be clearly understood and readily carried into effect we have appended hereto a sheet of drawings illustrating an embodiment of same, and wherein—

Fig. 1 is a side elevation partly in section showing the device in use when removing a wheel from an axle.

Fig. 2 is a plan view of Fig. 1.

Fig. 3 is an end elevation of Fig. 1.

Fig. 4 is a sectional plan view, in which the device is fitted with an adaptor for a larger diameter wheel hub.

Fig. 5 is a sectional plan view showing the device fitted with an adaptor for removing pulleys, wheels, etc., from shafts, when the pulley or wheel, etc. is some distance from the end of the shaft.

Fig. 6 is a sectional plan view showing the adaptor illustrated in Fig. 5 equipped with the necessary extension rods and plate for connection to the pulley or wheel, etc. and Fig. 7 shows, in section, how our invention can be adapted for removing hubs from spindles, and for like purposes.

Referring to the drawings the device comprises a collar 1 having a truncated conical or other conveniently integral extension 2. The collar 1 is threaded internally as at 3 to enable it to be threaded on to a hub 4 of a wheel 5, this arrangement being particularly useful in connection with wheel hubs having hub caps or nuts threaded on them, because by removing the hub cap or nut, the collar 1 can be threaded on to the hub. The portion 2 of the collar has a diametrical slot 6 across it which accommodates the cam shaped end 7 of a lever 8, the cam shaped end 7 having a number of holes 9 through a selected one of which a removable bolt 10 is passed, the said bolt passing through the portion 2 of the collar 1. The lever 8 has a handle 11 connected integrally or otherwise fixedly attached to it, or the handle 11 can be a separate element adapted to be introduced in a socket in the lever 8.

The cam shaped end 7 is adapted to engage the end of the axle 12 of the wheel as shown in Fig. 1, and as the lever 8 is raised the cam shaped portion 7 gradually increases the distance of the bolt 10 from the end of the axle thereby drawing the wheel along the axle.

The curvature of the cam shaped portion 7 is such as to provide a gradual pressure so as to make the operation an easy one.

When the hub of a wheel or the like is of a larger diameter than will receive the collar 1 an adaptor 13 (Fig. 4) can be employed, this adaptor being a collar threaded internally as at 14 to thread on to the hub. A distance piece 15 is provided where necessary to interpose between the end of the axle and the cam 7.

When the device is intended for removing an unthreaded article, for instance a pulley, or when the article is some distance from the end of the shaft, a bar or plate 16 can be engaged with the face of the pulley or other article furthest from the member 7. This bar is connected by means of rods 20 to an annular collar adaptor 17 engaged with the collar 1. The collar 1 is formed with a flange or step 18 to serve as an abutment for the adaptor 13 or 17. The distance between the bar or plate 16 and the adaptor 17 can be adjusted by means of the nuts 19 threaded on to the rods 20.

Our invention may be employed for removing hubs from spindles, and for like purposes. In Fig. 7 a slight modification of our invention is shown for this purpose, in which a pair of substantially half cylindrical members 21 have slipped on them a ring 22 to grip the inturned pointed ends 23 of the members 21 on to the hub or the like. A lever 8 is provided in the bifurcated end of a collar 24 which to all intents and purposes is the same as the collar 1. A distance piece 25 is employed where necessary.

What we claim is:—

1. A drawing device for the purpose set forth comprising a collar like member, and a cam edged lever carried by said collar, the said lever being adapted to engage a shaft or axle end, and the said collar being adapted to be connected to an object to be removed from the axle or shaft, said collar being formed with an extension having a diametrical slot to receive said lever, and a pin passing through said extension and the lever, said lever being provided with a number of holes to selectively receive said pin or bolt.

2. A drawing device for the purpose set forth comprising a collar like member, and a cam edged lever carried by said collar, the said lever being adapted to engage a shaft or axle end, and the said collar being adapted to be connected to an object to be removed from the axle or shaft, said collar being threaded for engagement with said object, and being provided with a shoulder, and a threaded adaptor for cooperation with said collar, said adaptor having a shoulder for engagement with the shoulder of said collar.

In witness hereof we have signed this specification.

JOHN GEORGE MASON.
JOSEPH SHAW.